United States Patent
Martiel et al.

(10) Patent No.: US 12,118,432 B2
(45) Date of Patent: Oct. 15, 2024

(54) METHOD FOR SYNTHESIZING PRODUCT OF PAULI ROTATIONS IN A QUANTUM CIRCUIT AND PROCESS FOR SYNTHESIZING QUANTUM CIRCUITS FOR TROTTER-SUZUKI N-ORDER EXPANSION

(71) Applicant: BULL SAS, Les Clayes sous Bois (FR)

(72) Inventors: Simon Martiel, Versailles (FR); Timothée Goubault de Brugière, Croissy S/Seine (FR)

(73) Assignee: BULL SAS, Les Clayes sous Bois (FR)

( * ) Notice: Subject to any disclaimer, the term of this patent is extended or adjusted under 35 U.S.C. 154(b) by 553 days.

(21) Appl. No.: 17/458,758

(22) Filed: Aug. 27, 2021

(65) Prior Publication Data
US 2022/0067566 A1     Mar. 3, 2022

(30) Foreign Application Priority Data
Sep. 2, 2020 (EP) .................................... 20305969

(51) Int. Cl.
*G06N 10/00* (2022.01)
*G06F 11/34* (2006.01)

(52) U.S. Cl.
CPC ......... *G06N 10/00* (2019.01); *G06F 11/3442* (2013.01)

(58) Field of Classification Search
CPC ............................ G06N 10/00; G06F 11/3442
See application file for complete search history.

(56) References Cited

U.S. PATENT DOCUMENTS

| | | | | |
|---|---|---|---|---|
| 10,366,339 B2 * | 7/2019 | Bocharov | ............... | G06N 10/20 |
| 10,922,457 B2 * | 2/2021 | Nam | ...................... | G06F 30/39 |
| 11,200,360 B1 * | 12/2021 | Bravyi | ................... | G06F 30/392 |
| 2006/0123363 A1 * | 6/2006 | Williams | ................ | G06N 10/00 |
| | | | | 977/839 |
| 2015/0214984 A1 * | 7/2015 | Ahn | ........................ | G06N 10/00 |
| | | | | 714/755 |
| 2019/0205783 A1 * | 7/2019 | Nam | ...................... | G06N 10/00 |
| 2020/0184361 A1 * | 6/2020 | Horii | ...................... | G06F 9/5016 |

(Continued)

OTHER PUBLICATIONS

European Search Report for corresponding EP Application No. 20305969, dated Feb. 17, 2021.

(Continued)

*Primary Examiner* — Nha T Nguyen
(74) *Attorney, Agent, or Firm* — MEAGHER EMANUEL LAKS GOLDBERG & LIAO, LLP

(57) ABSTRACT

A method for generalizing an algorithm configured to synthesize a diagonal product of Pauli rotations to synthesize a product of Pauli rotations comprising X, Y and Z rotations, the method comprising:

Providing a table of p number of rows and m number of columns, where p is a number of qubits and m a number of rotations in the quantum circuit, and where the table comprises X, Y, Z or I entry corresponding to the respective rotations of the qbits;

Determining a pivot row, and recursively, until all rotations of the product of Pauli rotations are 1-qubit rotations:

Determine a target row,

Conjugate the target row with the pivot row by insertion of predetermined quantum gates on the qubits corresponding to the target row and/or pivot row by calling, at each recursive call, entries of the same type of the pivot row and by always calling first the identity entry.

11 Claims, 11 Drawing Sheets

(56) References Cited

U.S. PATENT DOCUMENTS

| | | | | |
|---|---|---|---|---|
| 2020/0311590 | A1* | 10/2020 | Chen | G06N 10/00 |
| 2021/0232960 | A1* | 7/2021 | Scott | G06N 3/047 |
| 2021/0272000 | A1* | 9/2021 | van den Berg | G06F 17/16 |
| 2023/0040289 | A1* | 2/2023 | Sels | G06N 10/60 |
| 2024/0080193 | A1* | 3/2024 | Sandberg | H04L 9/32 |

OTHER PUBLICATIONS

Amy et al., "On the CNOT-complexity of CNOT-PHASE circuits", arxiv.org. arXiv:1712.0859v2, Cornell University Library, 201 Olin Library Cornell University Ithaca, NY, 14853, Dec. 5, 2017.

Meijer-Van De Griend et al., "Architecture-aware synthesis of phase polynomials for NISQ devices", arxiv.org. arXiv:06052v1, Cornell University Library, 201 Olin Library Cornell University, Ithaca, NY 14853, Apr. 13, 2020.

Cowtan et al., "A Generic Compilation Strategy for the Unitary Coupled Cluster Ansatz", arXiv.10515v3, pp. 1-26, Aug. 27, 2020 (Aug. 27, 2020).

Cowtan et al., "Phase Gadget Synthesis for Shallow Circuits", arxiv.org., Cornell University Library, 201 Olin Library Cornell University, Ithaca, NY, 14853, Jun. 4, 2019.

\* cited by examiner

| Algorithm 1 |
|---|
| 1: procedure GRAYSYNTH |
| 2:     $cols \leftarrow \{0..T.shape[1]\}$ |
| 3:     $qbits \leftarrow \{0..T.shape[0]\}$ |
| 4:     $ReduceColumns()$ |
| 5:     $IdentityRec(cols, qbits)$ |
| 6: end procedure |
| 7: procedure IDENTITYREC($cols, qbits$) |
| 8:     if $cols$ or $qbits$ is empty then |
| 9:         return |
| 10:     end if |
| 11:     $pivrow \leftarrow \arg\max_{i \in qbits} \max_{x \in \mathbb{F}_2} |\{T[i,j] = x | j \in cols\}|$ |
| 12:     $cols0, cols1 \leftarrow SplitCols(pivrow, cols)$ |
| 13:     $IdentityRec(cols0, qbits \setminus \{pivrow\})$ |
| 14:     $ZRec(pivrow, cols1, qbits)$ |
| 15: end procedure |
| 16: procedure ZREC($row, cols, qbits$) |
| 17:     if $qbits$ is empty then |
| 18:         return |
| 19:     end if |
| 20:     $pivrow \leftarrow \arg\max_{i \in qbits, i \neq row} |\{T[i,j] = 1 | j \in cols\}|$ |
| 21:     if $pivrow$ has at least a 1 then |
| 22:         $PlaceCnot(row, pivrow)$ |
| 23:     end if |
| 24:     $cols \leftarrow ReduceColumns(cols)$ |
| 25:     $cols0, cols1 \leftarrow SplitCols(row, cols)$ |
| 26:     $IdentityRec(cols0, qbits \setminus \{row\})$ |
| 27:     $ZRec(row, cols1, qbits)$ |
| 28: end procedure |

FIG. 2

| Algorithm 3 |
| --- |
| 1: procedure PAULISYNTH |
| 2:     $cols \leftarrow \{0..T.shape[1]\}$ |
| 3:     $qbits \leftarrow \{0..T.shape[0]\}$ |
| 4:     $cols \leftarrow ReduceColumns(cols)$ |
| 5:     $IdentityRec(cols, qbits)$ |
| 6: end procedure |
| 7: procedure IDENTITYREC($cols, qbits$) |
| 8:     if $cols$ or $qbits$ is empty then |
| 9:         return |
| 10:     end if |
| 11:     $pivrow \leftarrow \arg\max_{i \in qbits} \max_{x \in \{I,X,Y,Z\}} |\{T[i,j] = x, j \in cols\}|$ |
| 12:     $cols0, colsrem \leftarrow SplitCols(I, pivrow, cols)$ |
| 13:     $IdentityRec(cols0, qbits \setminus \{pivrow\})$ |
| 14:     while $colsrem$ is not empty do |
| 15:         $pauli \leftarrow \arg\max_{x \in \{X,Y,Z\}} |\{T[pivrow,j] = x, j \in colsrem\}|$ |
| 16:         $colsp, colsrem \leftarrow SplitCols(pauli, pivrow, colsrem)$ |
| 17:         $PauliRec(pauli, pivrow, colsp, qbits)$ |
| 18:     end while |
| 19: end procedure |
| 20: procedure PAULIREC($pauli, row, cols, qbits$) |
| 21:     if $qbits$ is empty then |
| 22:         return |
| 23:     end if |
| 24:     $pivrow \leftarrow \arg\max_{i \in qbits, i \neq row} \max_{x \in \{X,Y,Z\}} |\{T[i,j] = x, j \in cols\}|$ |
| 25:     if $pivrow$ has at least an entry in $\{X,Y,Z\}$ (restricted to $cols$) then |
| 26:         $pauli\_target \leftarrow \max_{x \in \{X,Y,Z\}} |\{T[pivrow,j] = x, j \in cols\}|$ |
| 27:         $BasisChange(pauli, row)$ |
| 28:         $BasisChange(pauli\_target, pivrow)$ |
| 29:         $PlaceCnot(row, pivrow)$ |
| 30:     end if |
| 31:     $cols \leftarrow ReduceColumns(cols)$ |
| 32:     $cols0, colsrem \leftarrow SplitCols(I, row, cols)$ |
| 33:     $IdentityRec(cols0, qbits \setminus \{row\})$ |
| 34:     while $colsrem$ is not empty do |
| 35:         $pauli \leftarrow \arg\max_{x \in \{X,Y,Z\}} |\{T[row,j] = x, j \in colsrem\}|$ |
| 36:         $colsp, colsrem \leftarrow SplitCols(pauli, row, colsrem)$ |
| 37:         $PauliRec(pauli, row, colsp, qbits)$ |
| 38:     end while |
| 39: end procedure |

FIG. 4A

Algorithm 4 PauliSynth sub-routines

1: procedure SPLITCOLS(*pauli, row, cols*)
2:     $colsp \leftarrow \{col \in cols, T[row, col] = pauli\}$
3:     $colsrem \leftarrow \{col \in cols, T[row, col] \neq pauli\}$
4:     return *colsp, colsrem*
5: end procedure
6: procedure REDUCECOLUMNS(*cols*)
7:     for *col* in *cols* do
8:       if $|\{T[i, col], i \in \{0, ..., n-1\}\}| = 1$ then
9:         $q \leftarrow \arg\max_{i \in \{0,...,n-1\}} T[i, col]$
10:        $p \leftarrow T[q, col]$
11:        yield $Rp(phases[col])$ on qubit $q$
12:        $cols.remove(col)$
13:       end if
14:     end for
15:     return *cols*
16: end procedure
17: procedure BASISCHANGE(*pauli, row*)
18:     $B \leftarrow H$ if $pauli = X$ else $RX(\pi/2)$ if $pauli = Y$ else $I$
19:     for *col* in $\{0, ..., m-1\}$ do
20:       $phase, T[row, col] \leftarrow B.col.B^{\dagger}$
21:       $phases[col] \leftarrow phases[col] * phase$
22:     end for
23: end procedure
24: procedure PLACECNOT(*c, t*)
25:     for *col* in $\{0, ..., m-1\}$ do
26:       $p_c, p_t \leftarrow T[c, col], T[t, col]$
27:       $phase, T[c, col], T[t, col] \leftarrow CNOT.(p_c \otimes p_t).CNOT$
28:       $phases[col] \leftarrow phases[col] * phase$
29:     end for
30: end procedure

FIG. 4B

| IN | phase | OUT |
|----|-------|-----|
| II | 1 | II |
| IX | 1 | IX |
| IY | 1 | ZY |
| IZ | 1 | ZZ |
| XI | 1 | XX |
| XX | 1 | XI |
| XY | 1 | YZ |
| XZ | -1 | YY |
| YI | 1 | YX |
| YX | 1 | YI |
| YY | -1 | XZ |
| YZ | 1 | XY |
| ZI | 1 | ZI |
| ZX | 1 | ZX |
| ZY | 1 | IY |
| ZZ | 1 | IZ |

| IN | phase | OUT |
|----|-------|-----|
| I | 1 | I |
| X | 1 | Z |
| Y | -1 | Y |
| Z | 1 | X |

| IN | phase | OUT |
|----|-------|-----|
| I | 1 | I |
| X | 1 | X |
| Y | 1 | Z |
| Z | -1 | Y |

METHOD FOR SYNTHESIZING PRODUCT OF PAULI ROTATIONS IN A QUANTUM CIRCUIT AND PROCESS FOR SYNTHESIZING QUANTUM CIRCUITS FOR TROTTER-SUZUKI N-ORDER EXPANSION

TECHNICAL FIELD

The invention concerns methods for synthesizing product of Pauli rotations in a quantum circuit and processes for synthesizing quantum circuits for Trotter-Suzuki n-order expansion.

BACKGROUND ART

From a first prior art *Quantum Science and Technology*, Amy et al, together with *Architecture-aware synthesis of phase polynomials for NISQ devices*, Meijer et al, a method is known for synthesise quantum circuits for phase polynomials, for quantum circuits containing only CNOT quantum gates and rotation along Z axis. This method is also known as Graysynth algorithm. With this method, it is possible to obtain a compiled quantum circuit comprising a low number of CNOT gates. However, this method can be applied only to circuits comprising only the two above-mentioned quantum gates.

From a second prior art *A Generic Strategy for the Unitary Coupled Cluster Ansatz*, Cowtan et al, a method is known to compile circuit by partitioning Pauli exponential terms into mutually commuting sets that are then diagonalised using Clifford circuits, to finally obtain compiled circuits while reducing depth and number of CNOT quantum gates. This method particularly performs basis changes to obtain only rotational quantum gates along Z-axis.

Although the results are optimized, this method requires an exponential number of steps and time to obtain these results, since it is needed, as a pre-processing step, to first modify the circuit to obtain only rotational quantum gates along Z-axis, which is complex and time consuming.

These known solutions make it possible to obtain a compiled circuit, although a primary condition of having only rotational quantum gates along Z-axis is required.

The invention at least partially remedies the shortcuts of the prior art and optimizes the synthesizing of quantum circuit comprising Pauli rotations by generalizing the Graysynth algorithm.

Therefore, according to the invention, it will be beneficial to transform the quantum circuit to obtain a table showing clearly the entanglement between the qubits, and the rotation that applies to each qubit, or to be provided with a table corresponding to the quantum circuit. Advantageously, the rotations in the quantum circuit will present small angles.

On this basis, the method will recursively choose a pivot row on which to apply a reduced number and predetermined types of quantum gates to finally obtain a synthesized quantum circuits independently of the type of rotational quantum gates initially present in the quantum circuit.

The method according to the invention therefore enables the compiling of a quantum circuit in a way with improved automation and optimization and suitable for any Paul rotations.

Finally, the method according to the invention leads to a synthesized quantum circuit with an optimized CNOT count.

To this aim, there is provided a method for synthesizing product of Pauli rotations, wherein said product of Pauli rotations comprises at least two different types of X, Y, and/or Z n-qbits Pauli rotations and identities (I), said method comprising:
providing a table of p number of rows and m number of columns, where p is a number of qubits and m a number of rotations in the quantum circuit, and where the table comprises X, Y, Z or I entry corresponding to the respective rotations of the qbits,
a step of determining a pivot row as being the row comprising a maximum number of the same type of X, Y, Z or I entry,
and wherein said method performs a subset of steps recursively, until all qubits performs only 1-qubit-rotation:
a step of determining if the pivot row comprises at least one identity entry and
if yes, determine a new pivot row having the maximum same entries, and being different from the first determined pivot row,
if no, performs the next step directly,
a step of determining a target row among remaining rows, said target row containing a maximum of non-identity entries interacting with the entries of the pivot row,
a step of conjugating said pivot row and said target row by inserting a predetermined type of quantum gates on their respective qubits in order to bring the X, Y or Z entry of at least the pivot row to I entry,
a step of rewriting the table according to the result of the conjugation, by replacing the X, Y and/or Z entry of at least the pivot row by an identity entry,
returning the synthesized table (i.e., the table that has been created via the rewriting process described above).

The recursive call on the pivot row, while always calling first the identity entry, allows the generalization of Graysynth algorithm to any arbitrary Pauli product, without requiring a first change to modify all the rotations to Z rotations.

In an embodiment, the quantum circuit is a rotation circuit.

In an embodiment, each row of the table corresponds to a qubit of the quantum circuit, the row and the corresponding qubit being defined by the same number.

As an example, the first row (row zero) is associated with the first qubit (qubits zero) and so on.

In an embodiment, the table is provided after:
Providing a quantum circuit corresponding to the product of Pauli rotations,
Rewriting the quantum circuits in the form of a table.

Hence, the method can be applied without having a quantum circuit by only being provided with the table. In other hand, the method can be applied without being provided with the table already written, the table can be obtained from the quantum circuit.

In an embodiment, the method further comprises:
providing a quantum rotation circuit representing the X, Y and/or Z n-qubits Pauli operators,
at each conjugation step, inserting the predetermined type of quantum gates on their respective qubits in the quantum rotation circuit,
according to the result of the conjugation, rewriting the quantum rotation circuit by replacing the n-qbits rotation of at least the pivot row by a 1-qbit rotation,
returning the synthesized quantum rotation circuit (i.e., the circuit based on the originally provided quantum rotation circuit, that was rewritten as described above).

Then, the method can be applied with the table and/or the rotation circuit.

In an embodiment, the method further comprises:
provide a phase gadget sequence representing the X, Y and/or Z n-qubits Pauli operators,
at each conjugation step, inserting the predetermined type of quantum gates on their respective qubits in the phase gadget sequence,
according to the result of the conjugation, rewriting the phase gadget sequence by replacing the n-qbits rotation of at least the pivot row by a 1-qbit rotation,
returning the phase gadget sequence.

In an embodiment, the conjugation step further comprises:
inserting the predetermined type of quantum gates on their respective qubits in the rotation circuit before the X, Y and/or Z n-qubits Pauli operators, and
inserting reversed quantum gates on the same qubits in the rotation circuit, after the X, Y and/or Z n-qubits Pauli operators.

The reversed quantum gates ensure to have the same circuit at the end.

In an embodiment, the method comprises, before determining the pivot row:
suppressing the columns of the table that contain only one rotation,
and inserting a corresponding phase gate in the quantum circuit.

During this step, the trivial columns are withdrawn from the table, such that the method does not take into account these columns and rotations. It allows a better optimization in term of time and computation.

In an embodiment, the conjugating step comprises:
one or several insertions of Clifford quantum gates between the pivot row and the target row in the quantum circuit.

First it allows to locally changing a row of the table to transform a Pauli operator into another one, and then CNOT is easily transposable on the parity table by distributing a row onto another row.

In an embodiment, the Clifford quantum gates preferably comprise:
$RX(\pi/2)$ quantum rotation gates and Hadamard quantum gates,
CNOT quantum gates,
Or a combination thereof.

Since the conjugation tables of these gates are known, they can be applied easily with a sure result at the end.

In an embodiment, the method further comprises an optimizing step wherein the returned synthesized rotation circuit is split to obtain:
A first sub-quantum circuit comprising only the inserted Clifford quantum gates and the 1-qubit rotations,
a second sub-quantum circuit comprising only the reversed Clifford gates,
and wherein only the first sub-circuit is executed.

Since the properties of a Clifford circuit are well known, only the first subcircuit can be executed. The second sub-circuit can be taken into account by modifying the measurements at the end of the method, for example.

In an embodiment, a Clifford correction corresponding to the second sub-circuit is applied to the first sub-circuit.

The Clifford correction can be calculated by various methods know in the art. The final execution of the circuit is then easier and more optimized.

In an embodiment, the product of Pauli rotations corresponds to a Hamiltonian simulation.

There is also provided a method for generalizing an algorithm configured to synthesize a diagonal product of Pauli rotations to synthesize a product of Pauli rotations comprising X, Y and Z rotations, the method comprising:
providing a table of p number of rows and m number of columns, where p is a number of qubits and m a number of rotations, and where the table comprises X, Y, Z or I entry corresponding to the respective rotations of the qbits;
determining a pivot row,
and recursively, until all rotations of the product of Pauli rotations are 1-qubit rotations:
determine a target row,
conjugate the target row with the pivot row by insertion of predetermined quantum gates on the qubits corresponding to the target row and/or pivot row by calling, at each recursive call, entries of the same type of the pivot row and by always calling first the identity entry.

There is also provided a process for synthesizing quantum circuits for Trotter-Suzuki n-order expansion comprising:
applying iteratively to each layer of the quantum circuit the method for synthesizing Pauli rotations in a quantum circuit according to the application.

BRIEF DESCRIPTION OF THE DRAWINGS

FIG. 2 shows a pseudo code of Graysynth algorithm.

FIGS. 4A and 4B show a pseudo code of the method according to an embodiment.

MORE DETAILED DESCRIPTION

FIGS. 1A to 1E illustrates a particular example of a phase polynomial synthesis, performed through Graysynth algorithm.

The Graysynth algorithm is made for the synthesis of the propagator of a diagonal Hamiltonian $H=\Sigma_i h_i P_i$. when H is diagonal, it can be described as a collection of parities and its propagator $e^{-i\gamma H}$ is exactly the product of $\pi_i e^{-\alpha_i \gamma P_i}$ where each $P_i$ is composed solely of Pauli Z rotations. Since all these terms commute, the product can be implemented in whatever order.

Phase polynomials form a particular set of unitary operators that can be implemented using only CNOT and rotation along Z-axis (or RZ gate) gates.

Below is described an exemplary application of the Graysynth algorithm for the following Pauli product:

$$\alpha_1 Z_0 Z_1 + \alpha_2 Z_0 Z_1 Z_2 + \alpha_3 Z_1$$

Figure 1A:
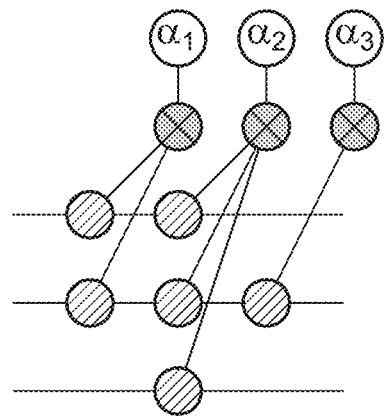
FIGS. 1A to 1E illustrate a phase gadget sequence on which the Graysynth algorithm is applied.
Figure 1B:
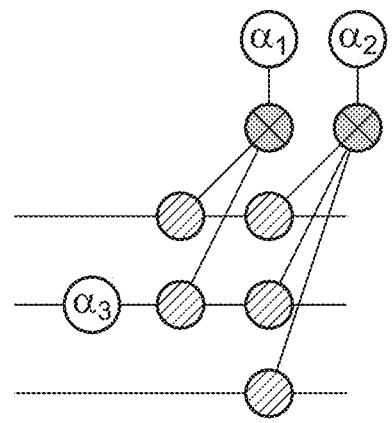

This product can be described in the form of a phase gadget sequence, using ZX calculus for example, as illustrated in FIG. 1A. Each of these gadget comprise a collection of striped Z nodes attached to a pair of crossed X nodes and nodes carrying the rotation angle $\alpha_1$, $\alpha_2$, $\alpha_3$. Each line corresponds to one qubit q0, q1, q2.

The synthesis starts by inserting a phase gate in place of the last gadget carrying the rotation angle $\alpha_3$ since this gadget is trivial and does not require and CNOT gate for its implementation. Indeed, the rotation angle only applies on qubit q2. The inserted phase gate can be commuted to the beginning of the phase gadget sequence. The result of this first step is illustrated on FIG. 1B.

Next, the purpose being of having only phase gadgets acting on only one qubit, some CNOT gates are injected in the phase gadget sequence.

Figure 1C:
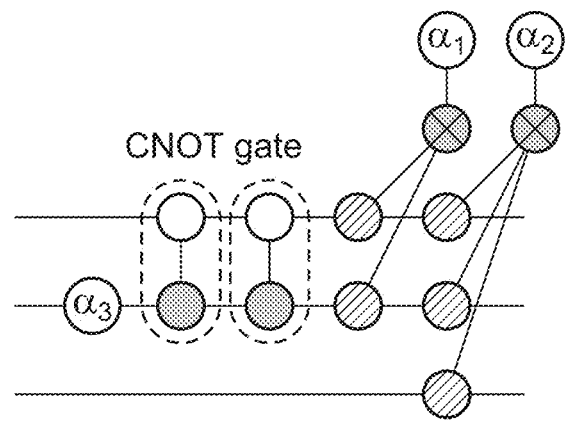

More precisely, as illustrated on FIG. 1C, a pair of CNOT gates is injected in the phase gadget sequence, before the two gadgets carrying the rotations angles $\alpha_1$, $\alpha_2$.

As described above, since the terms commute, the quantum gates and the phase gadget can be placed in any order.

Figure 1D:
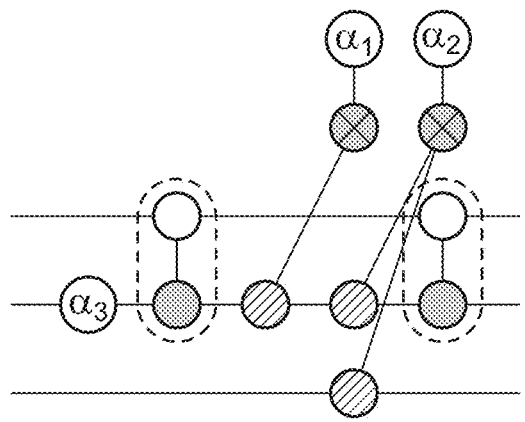

Then, in FIG. 1D, one of the CNOT gate is pulled at the end of the remaining gadget carrying the rotation angles $\alpha_1$, $\alpha_2$, effectively conjugating these gadgets with the pair of CNOT.

The gadget carrying the rotation angle di can be replaced with a phase gadget that will lodge itself against the first CNOT gate. Then the last remaining gadget carrying the rotation angle $\alpha_2$ is conjugated with a last CNOT gate ?.

Figure 1E:
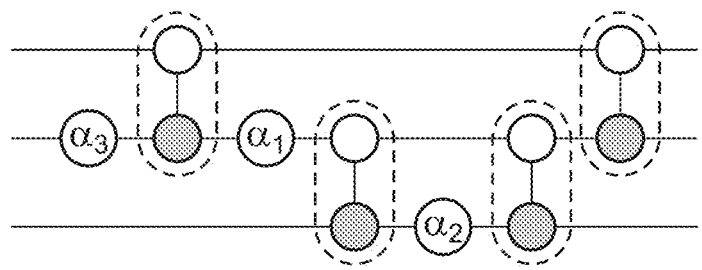

The final obtained phase gadget sequence is shown on FIG. 1E. The quantum circuit obtained at the end of the Graysynth algorithm, for this particular example, comprises three phase gadgets carrying the rotation angles $\alpha_1$, $\alpha_2$, $\alpha_3$, and four CNOT gates.

Graysynth algorithm performs the conjugation of the phase gadgets by CNOT gates in order to reduce their arity. The algorithm is called recursively until all gadgets are of arity 1, or, in other words, until all the qubits perform only 1-qubit rotation.

The recursive structure of the Graysynth algorithm can also be illustrated by use of a table depicting the Pauli product.

The gadgets are represented in a p×m table, where each column represents a parity and each line represents a qubit. For example, the Paul product described above:

$$\alpha_1 Z_0 Z_1 + \alpha_2 Z_0 Z_1 Z_2 + \alpha_3 Z_1$$

Can be represented by the following table:

$$\begin{pmatrix} 1 & 1 & 0 \\ 1 & 1 & 1 \\ 0 & 1 & 0 \end{pmatrix}$$

At each step of recursion, the Graysynth algorithm determines a pivot row in the table, by looking for the row having the most 0s or 1s among all the remaining columns.

In the table, the 1s represent the Z rotations and the 0s represent the identities.

The algorithm is then called recursively in two successive steps. First, the algorithm is called recursively on the columns containing 0s on the pivot row while removing the pivot row from the possible interacting rows. Second, the algorithm is called recursively on the columns containing 1s on the pivot row while looking for a target row that shares the largest possible number of 1s with the pivot row among the remaining interacting rows As an example, FIG. 2 illustrates the pseudo code of Graysynth algorithm.

Figure 3:
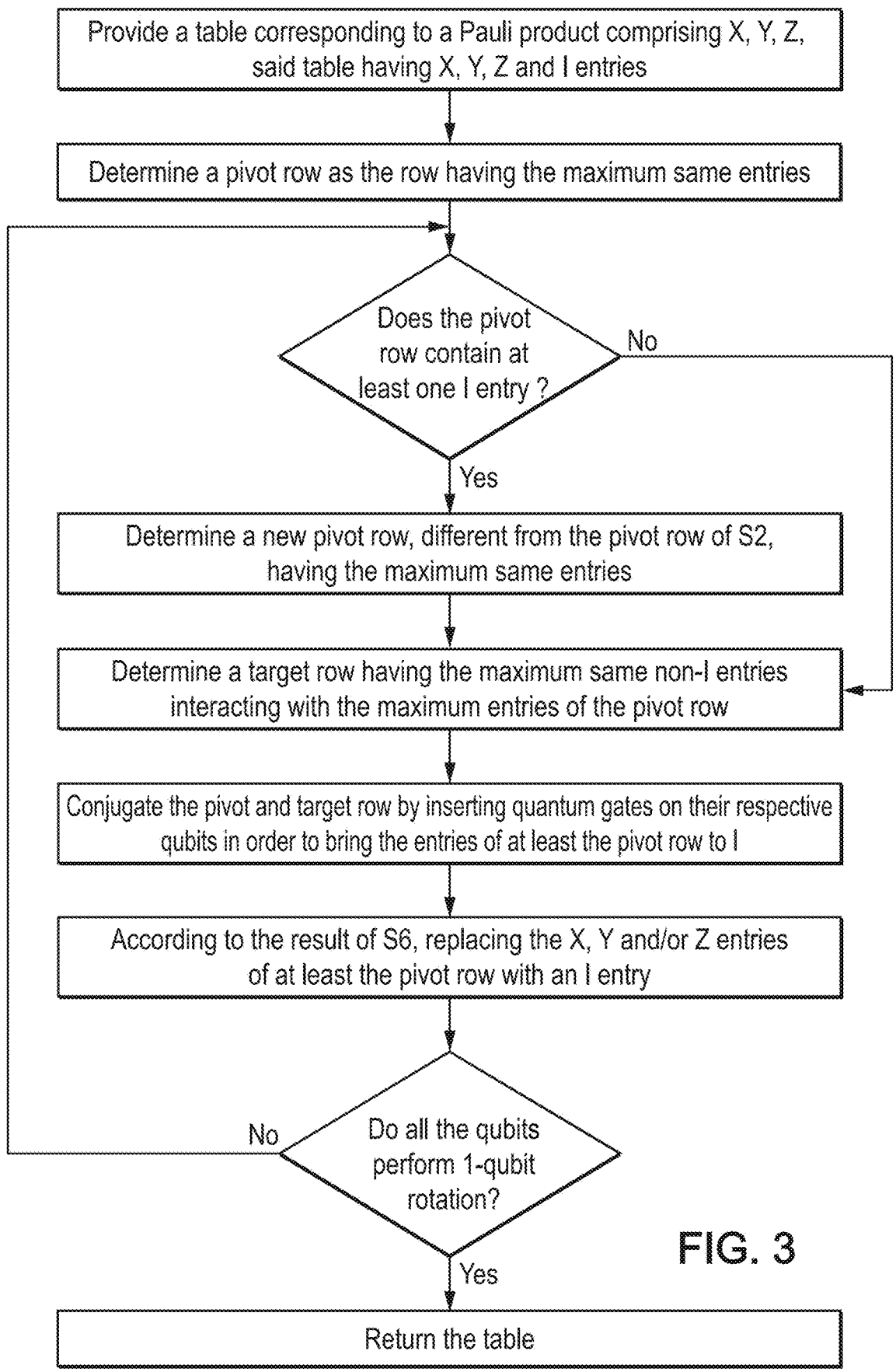
FIG. 3 illustrates the steps of the method according to an embodiment.

FIG. 3 illustrates the step of the method according to an embodiment.

To generalize the Graysynth algorithm to any type of Pauli product, including product comprising rotations along X, Y and/or Z-axis, the Pauli product is rewritten with a table of p×m dimension, with p the number of qubits, m the number of rotations, and a list of corresponding angles α of length m.

In an embodiment, the table is provided and there is no step of re-writing the Hamiltonian product (or "Hamiltonian"). This step corresponds to step S1 of FIG. 3.

More specifically, the generalization of Graysynth algorithm, according to the present application, allows synthesizing any type of Hamiltonian.

In contrary with Graysynth algorithm, the above described Hamiltonian comprises arbitrary rotations including X, Y and Z rotations and identities (represented by hyphens in the table).

After determining a pivot row, Graysynth recursively calls the 0s entries in the pivot row, and then the 1s entries in the pivot row.

At each recursive calls, CNOT gates are inserted between the pivot row and the target row as described above.

To generalize the Graysynth algorithm, instead of sorting the columns according to two categories being I entries and Z entries, the present method sorts the columns into four categories, being I, X, Y and Z entries.

The pivot row is determined at step S2 as the row having the most similar entries between I, X, Y and Z entries.

Then, the method determines if the pivot row comprises identities entries at step S3.

If the pivot row does not comprise identity entries, the method directly performs step S5.

If the pivot row comprises identities entries, a new pivot row is determined at step S4. This new pivot row is different from the pivot row determined at step S2. The new pivot row is the pivot row having the maximum number of same entries.

Step S3 to S5 allow ensuring that, when the method performs a call on the pivot row for its X, Y or Z entries, no new entry of the called entry occurs. Then, the recursive call begins with a call on the identities entries of the pivot row instead of a X, Y or Z entry.

At step S5, a target row is determined. The target row is determined as the row comprising the maximum of same non-identities entries, i.e. X, Y and/or Z entries, that interacts with the pivot row.

At step S6, the target and pivot row are conjugated by inserting predetermined quantum gates on their respective qubits in order to bring the entries of the pivot row to identities entries.

In an example, the quantum gates are Clifford quantum gates.

For example, the quantum gates are rotation along X axis quantum gates (or X rotation gates or RX($\pi/2$)), Hadamard quantum gates and CNOT quantum gates.

The X rotation gates and/or the Hadamard rotation gates can be applied on the qubit corresponding to the target row and/or the pivot row. The CNOT gates are inserted between the qubit corresponding to the pivot row and the qubit corresponding to the target row.

At step S7, the table is rewritten by replacing the X, Y and/or Z entries by identity entries, according to the result of the conjugation performed at step S6.

At step S8, the method recursively calls the pivot and performs step S3 on the pivot row, until all the qubits are of arity 1, or said differently, until all the qubits perform 1-qubit rotation.

Then, the table is returned at step S9.

FIG. 4 illustrates the pseudo code of the algorithm according to an embodiment of the method.

Below is described a non-limitative exemplary embodiment according to an embodiment of the method.

The following Hamiltonian is considered to illustrate this example:

$$H=\alpha_1 X_1+\alpha_2 Z_2 Y_3+\alpha_3 X_1 Y_3+\alpha_4 X_1 Y_2 Z_3$$

This Hamiltonian product can be represented by the following table:

$$\begin{pmatrix} Y & Y & Z & Y & X \\ - & - & Y & Y & Z \\ Y & X & - & X & - \end{pmatrix}$$

Figure 5A:
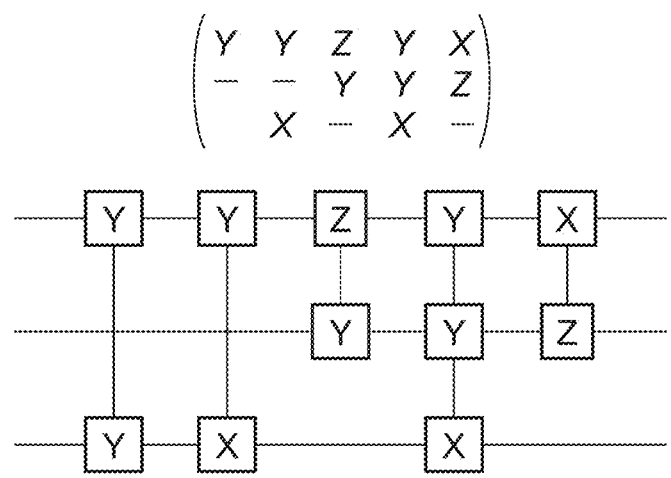
FIGS. 5A to 5G illustrates a rotation circuit on which the method according to one embodiment is applied.

The corresponding rotation circuit is illustrated on FIG. 5A.

In an embodiment, only the table is sufficient to obtain the synthesize circuit.

As described with reference to FIG. 3, at step S2 the pivot row is determined. In this example, row 0 is picked since it contains three Y entries, while the other rows contain at most only two same entries.

Since the pivot row does not contain any identity entry, step S5 is directly performed.

Figure 5B:
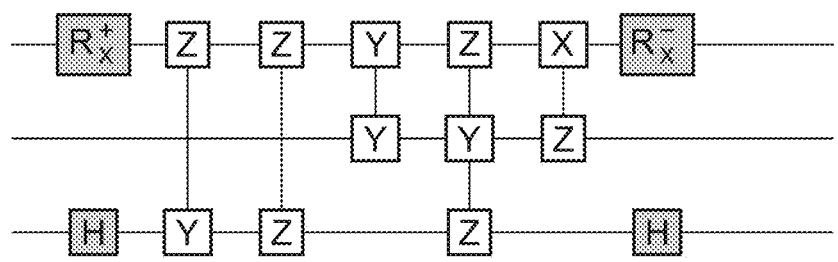

The target row in this case will be row 2 since it contains two X entries interacting with two Y entries of the pivot row A conjugation by a X rotation gate is performed on row 0 and a conjugation of Hadamard is performed on row 2, producing the circuit illustrated on FIG. 5B.

A CNOT gate is then inserted from qubit 0 to qubit 2 (corresponding respectively to row 0 and row 2) and all rotation axis through the CNOT gate is conjugated. The obtained rotation circuit is illustrated on FIG. 5C. these steps corresponds to step S6.

Figure 5C:
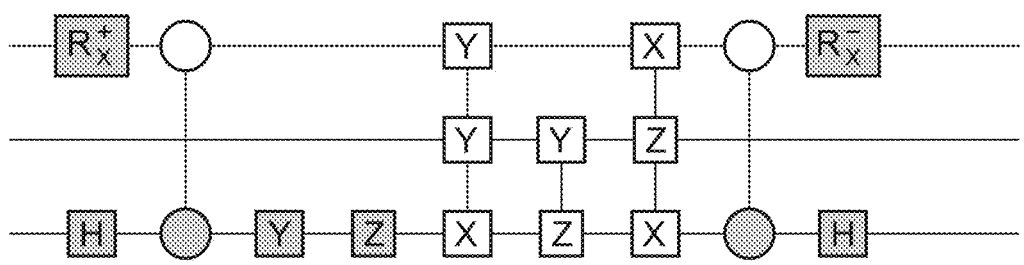
Figure 5D:
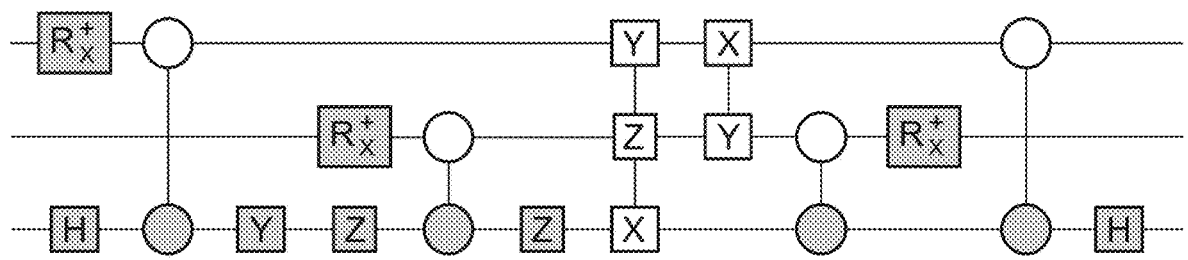
Figure 5E:
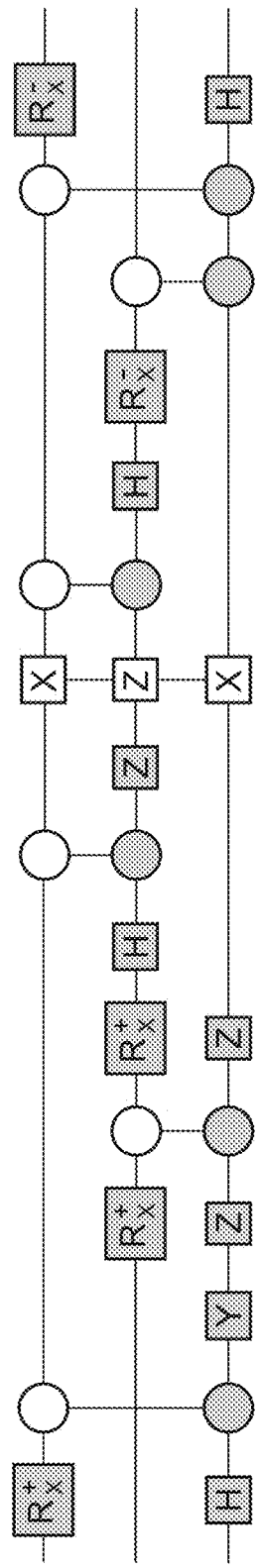
Figure 5F:
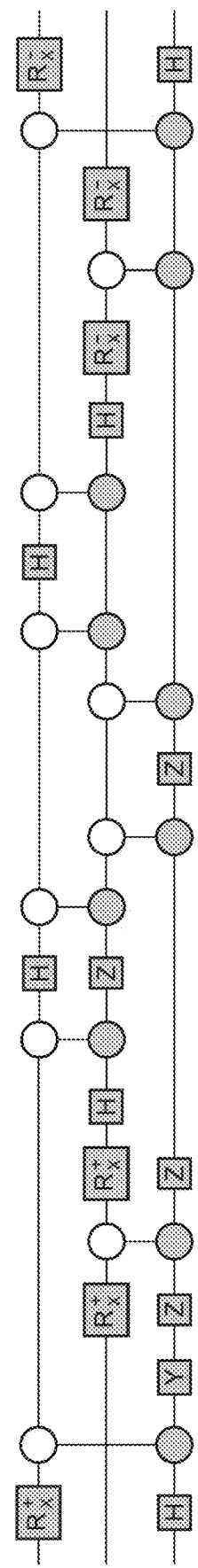
Figures 5G, 6A, 6B, 6C:
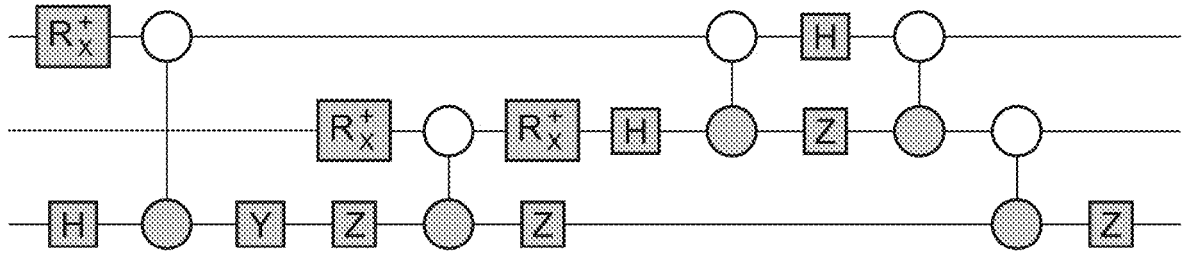
FIG. 6A to 6C illustrate the conjugation tables of CNOT, $RX(\pi/2)$ and Hadamard quantum gates.

The conjugation and insertion of quantum gates can be performed by using the tables illustrated on FIGS. 6A to 6C.

FIG. 6A illustrates the CNOT conjugation table. The table is read as follow: CNOT(IN)CNOT=phase.OUT.

FIG. 6B illustrated the Hadamard conjugation table.

FIG. 6C illustrates the conjugation table of the RX($\pi$/2) gate.

The method then knows exactly what will be the result of the insertion of the predetermined gates, which ensure having an optimized result.

Then, according to the result of the conjugation, the X, Y, and/or Z rotation entries in the table can be replaced by identities according to the result of the conjugation.

In this particular example, the obtained table will be:

$$\begin{pmatrix} - & - & Y & - & X \\ - & - & Y & Y & Z \\ Y & Z & X & Z & X \end{pmatrix}$$

The corresponding circuit is illustrated on FIG. 5C, in which the first two parities ZY and ZZ are replaced by the respective 1-qubit rotations along Y axis and Z axis.

Then, since there are still qubits performing 1-qubit rotation in the rotation circuit, and still q-bit of arity 2 or more in the table, step S3 is performed again.

In an embodiment, the table can be re-written in a sub-table in which the columns having only one rotation entry are withdrawn since these columns become trivial. The sub-table is then:

$$\begin{pmatrix} Y & - & X \\ Y & Y & Z \\ X & Z & X \end{pmatrix}$$

The method recursively calls the pivot row 0. Since pivot row 0 comprises an identity entry column 1 of the sub-table, a new pivot row is determined.

The new pivot row is row 2 since it contains two X entries. The target row will be row 1 which does not contain identity.

Row 1 is then conjugated by a RX($\pi$/2) gate followed by a CNOT gate from row 1 to row 2, leading to the rotation circuit illustrated on FIG. 5D.

On the rotation circuit of FIG. 5D, it can be seen that a new 1-qubit rotation gate Z has been inserted.

The table, or the sub-table, is rewritten to insert identity entries in place of the rotation entries X, Y and/or Z in the pivot row. In this particular example, the sub-table can be re-written in a second sub-table being:

$$\begin{pmatrix} Y & X \\ Z & Y \\ X & - \end{pmatrix}$$

Then, since all qubit are not of arity 1, the method recursively calls the pivot row 0. Since row 0 does not contain any identity, the target row is directly determined. In this case, the target row is row 1 since it contains the maximum non-identity entries.

By conjugating row 1 by a Hadamard gate, an RX($\pi$/2) gate and inserting a CNOT gate between qubit 0 and qubit 1, the rotation circuit of FIG. 5E will be obtained.

Finally, with a last recursive call on the remaining column, the circuit of FIG. 5F is obtained.

The final circuit that can be returned by the method is obtained by removing the Clifford circuit portion at the end of the rotation circuit. This circuit is illustrated on FIG. 5G.

The method described with reference to FIGS. 1 to 5F can be implemented to synthesize circuits for Trotter-Suzuki n-order expansion according to an embodiment.

More precisely, the method provides a routine to synthesize a single layer of a Trotter-Suzuki expansion.

In an embodiment, this synthesizing can be generalized to all the layers of a Trotter-Suzuki expansion. The method is applied iteratively i times to the circuit in order to synthesize the i individual layers.

Figure 7:
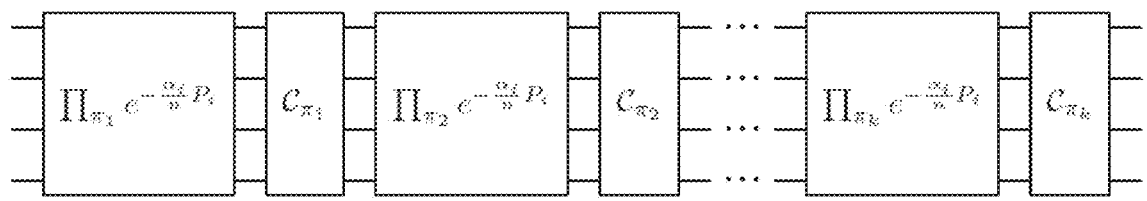
FIG. 7 illustrates a Trotter-Suzuki n order expansion circuit.

This iteration will lead to the quantum circuit illustrated on FIG. 7, where $\pi_{\pi i} e^{-(\alpha i/n)P i}$ corresponds to an ordered product of Pauli rotations as obtained on FIG. 5G and which corresponds to an Hamiltonian, and where CT corresponds to the Clifford circuit as removed from FIG. 5G.

The Clifford circuit actually corresponds to a correction to apply to the qubits in order to fix the qubits.

The optimization and correction of such Clifford circuits is known in the art.

The process for synthesizing quantum circuits for Trotter-Suzuki n-order expansion as described frees itself from the fixing by commuting the Clifford corrections to the Clifford circuit portion and either conjugating the final observable to measure through the resulting overall Clifford correction, or altering the final measurements via standard methods.

What is claimed is:

1. Method for synthesizing product of Pauli rotations, wherein said product of Pauli rotations comprises at least two different types of X, Y, and/or Z n-qubits Pauli rotations and identities (I), said method comprising:
  providing a table of p number of rows and m number of columns, where p is a number of qubits and m a number of rotations in a quantum circuit, and where the table comprises X, Y, Z or I entry corresponding to the respective rotations of the qubits;
  determining a pivot row of said table, the pivot row being a first row comprising a maximum number of a same type of X, Y, Z or I entry;
  performing a subset of steps recursively on said table, until all qubits perform only 1-qubit-rotation, the subset of steps comprising:
    determining if the pivot row comprises at least one identity entry;
    determining a target row among remaining rows, said target row containing a maximum of non-identity entries interacting with the entries of the pivot row;
    conjugating said pivot row and said target row by inserting a predetermined type of quantum gates on their respective qubits in order to bring the X, Y or Z entry of at least the pivot row to I entry; and
    rewriting the table according to a result of the conjugation, by replacing the X, Y and/or Z entry of at least the pivot row by an identity entry; and
  returning the rewritten table,
  wherein if the pivot row is determined to comprise at least one identity entry, the pivot row is determined as being a second row having the maximum number of the same type of X, Y, Z, or I entry, and being different from the first row, and
  wherein if the pivot row is determined to not comprise at least one identity entry, the determination of a target row is performed directly after.

2. Method according to claim 1, comprising, before determining the pivot row:
  suppressing one or more columns of the table that contain only one rotation; and
  and inserting a corresponding phase gate in the quantum circuit.

3. Method according to claim 1, wherein the table is provided after:
  providing the quantum circuit corresponding to the product of Pauli rotations; and
  rewriting the quantum circuits in a form of a table.

4. Method according to claim 3, wherein the conjugating step comprises:
  at least one insertion of Clifford quantum gates between the pivot row and the target row in the quantum circuit.

5. Method according to claim 4, wherein the Clifford quantum gates comprise:
  $RX(\pi/2)$ quantum rotation gates and Hadamard quantum gates,
  CNOT quantum gates, or
  a combination thereof.

6. Method according to claim 1, further comprising:
  at each conjugation step, inserting the predetermined type of quantum gates on their respective qubits in the quantum circuit;
  according to a result of a conjugation, creating a synthesized quantum circuit based on the quantum circuit, by replacing the n-qubits rotation of at least the pivot row by a 1-qubit rotation; and
  returning the synthesized quantum circuit.

7. Method according to claim 6, wherein the conjugation step further comprises:
  inserting the predetermined type of quantum gates on their respective qubits in the quantum circuit before the X, Y and/or Z n-qubits Pauli operators; and
  inserting reversed quantum gates on the same qubits in the quantum circuit, after the X, Y and/or Z n-qubits Pauli operators.

8. Method according to claim 6, further comprising an optimizing step wherein the returned synthesized quantum circuit is split to obtain:
  a first sub-quantum circuit comprising only Clifford quantum gates and 1-qubit rotations; and
  a second sub-quantum circuit comprising only reversed Clifford gates,
  wherein only the first sub-circuit is executed.

9. Method according to claim 8, wherein a Clifford correction corresponding to the second sub-circuit is applied to the first sub-circuit.

10. Method according to claim 1, wherein the product of Pauli rotations corresponds to a Hamiltonian simulation.

11. Process for synthesizing quantum circuits for Trotter-Suzuki n-order expansion comprising:
  applying iteratively to each layer of the quantum circuit the method for synthesizing Pauli rotations in a quantum circuit according claim 1.

* * * * *